United States Patent [19]
Schaenzer et al.

[11] Patent Number: 5,831,797
[45] Date of Patent: Nov. 3, 1998

[54] SLIDER WITH MESA FOR OPTICAL DISC DATA STORAGE SYSTEM

[75] Inventors: Mark J. Schaenzer, Eagan; Lori G. Swanson, Bloomington; Gregory S. Mowry, Burnsville; Lance E. Stover, Eden Prairie, all of Minn.

[73] Assignee: Seagate Technology, Inc., Scotts Valley, Calif.

[21] Appl. No.: 931,431

[22] Filed: Sep. 16, 1997

Related U.S. Application Data

[60] Provisional application No. 60/053,485, Jul. 23, 1997.
[51] Int. Cl.$^6$ .............................. G11B 13/04; G11B 7/08
[52] U.S. Cl. .............................. 360/114; 360/103; 369/13
[58] Field of Search ...................... 360/114, 103, 360/104; 369/44.12, 44.14, 44.15, 44.16, 44.19, 44.21, 44.22, 44.39, 13, 149, 219, 244

[56] References Cited

U.S. PATENT DOCUMENTS

| | | | |
|---|---|---|---|
| 3,980,811 | 9/1976 | Schaefer et al. | 369/109 |
| 4,229,067 | 10/1980 | Love | 385/28 |
| 4,310,916 | 1/1982 | Dil | 369/109 |
| 4,443,700 | 4/1984 | Macedo et al. | 250/227.16 |
| 4,569,038 | 2/1986 | Nagashima et al. | 369/44.26 |
| 4,581,529 | 4/1986 | Gordon | 250/227.26 |
| 4,706,235 | 11/1987 | Melbye | 369/44.37 |
| 4,769,800 | 9/1988 | Moser et al. | 369/32 |
| 4,815,064 | 3/1989 | Melbye | 369/59 |
| 4,933,537 | 6/1990 | Takahashi et al. | 235/454 |
| 4,994,658 | 2/1991 | Takahashi et al. | 235/473 |
| 5,004,307 | 4/1991 | Kino et al. | 359/356 |
| 5,096,277 | 3/1992 | Kleinerman | 385/12 |
| 5,105,408 | 4/1992 | Lee et al. | 369/13 |
| 5,124,961 | 6/1992 | Yamaguchi et al. | 369/13 |
| 5,125,750 | 6/1992 | Corle et al. | 359/819 |
| 5,138,676 | 8/1992 | Stowe et al. | 385/32 |
| 5,153,870 | 10/1992 | Lee et al. | 369/111 |
| 5,193,132 | 3/1993 | Uken et al. | 385/32 |
| 5,197,050 | 3/1993 | Murakami et al. | 369/13 |
| 5,212,379 | 5/1993 | Nafarrate et al. | 250/227.14 |
| 5,278,812 | 1/1994 | Adar et al. | 369/44.12 |
| 5,286,971 | 2/1994 | Betzig et al. | 250/227.26 |
| 5,363,463 | 11/1994 | Kleinerman | 385/123 |
| 5,434,631 | 7/1995 | Ishii et al. | 369/13 |
| 5,450,203 | 9/1995 | Penkethman | 356/373 |
| 5,493,393 | 2/1996 | Beranek et al. | 356/328 |
| 5,497,359 | 3/1996 | Mamin et al. | 369/44.15 |
| 5,517,472 | 5/1996 | Miyatake et al. | 369/13 |
| 5,535,189 | 7/1996 | Alon et al. | 369/102 |
| 5,537,385 | 7/1996 | Alon et al. | 369/119 |
| 5,566,159 | 10/1996 | Shapira | 369/99 |
| 5,574,712 | 11/1996 | Alon et al. | 369/102 |
| 5,592,444 | 1/1997 | Alon et al. | 369/13 |
| 5,598,393 | 1/1997 | Alon et al. | 369/102 |
| 5,615,183 | 3/1997 | Ishii | 369/13 |
| 5,615,203 | 3/1997 | Fukakusa | 369/44.12 |

Primary Examiner—Craig A. Renner
Attorney, Agent, or Firm—Westman, Champlin & Kelly, P.A.

[57] ABSTRACT

An optical storage system includes an optical disc for storing information in an optical reading format. An optical transducer is carried on a slider proximate a data surface of the optical disc and is used for transducing information on the disc surface. A mesa is provided on an air bearing surface of the slider and electrical conductors are provided which extend around the mesa.

15 Claims, 2 Drawing Sheets

SLIDER WITH MESA FOR OPTICAL DISC DATA STORAGE SYSTEM

BACKGROUND OF THE INVENTION

This application is based on Provisional Application Ser. No. 60/053,485, filed on Jul. 23, 1997, now abandoned.

The present invention relates generally to optical disc data storage systems. More specifically, the present invention relates to a slider for use in an optical head gimbal assembly of an optical disc data storage system.

Optical data storage disc systems are a technology for storing large quantities of data. The data is accessed by focusing a laser beam onto a data surface of the disc and detecting light reflected from or transmitted through the data surface.

In general, in optical storage systems, data is in the form of physical or magnetic marks carried on the surface of the disc which are detected using the reflected laser light. There are a number of different optical disc technologies which are known in the industry. For example, CD-ROMs are currently used to store digital data such as computer programs or digitized music. Typically, CD-ROMs are permanently recorded during manufacture. Another type of optical system is write-once read-many (WORM) systems in which a user may permanently write information onto a blank disc. It is also desirable to provide a system which is erasable, such as phase change and magneto-optic (M-O) systems. Phase change systems detect data by sensing a change in reflectivity. M-O systems read data by measuring the rotation of the incident light polarization due to the storage medium.

High density optical recording, particularly for near-field recording (i.e., M-O or phase change systems) typically requires an optical head gimbal assembly (OHGA) for carrying the transducing device over the data surface of the optical media. The OHGA includes a slider which "flies" proximate the data surface of the optical disc as the disc rotates at a high speed. An actuator is used to radially position the slider over the disc surface. U.S. Pat. No. 5,497,359, issued Mar. 5, 1996, entitled "OPTICAL DISC DATA STORAGE SYSTEM WITH RADIATION-TRANSPARENT AIRBEARING SLIDER" shows an example of a slider for use with an optical disc data storage system.

In order to write a magnetic bit of information onto the disc surface, the disc surface is optically heated, for example with M-O media, the laser beam is directed through an optical component in the slider, to a point above the Curie temperature of the medium. A magnetic coil carried on the slider is energized and the laser is turned off. As the magnetic medium cools below the Curie temperature, the heated spot is left with a desired magnetic orientation. However, typical prior art sliders for optical recording are not optimized for the coil design.

SUMMARY OF THE INVENTION

The present invention includes an optical storage system having an optical disc for storing information in an optically readable format on a data surface. An actuator arm has an end which is radially positionable relative to the data surface of the disc. A slider attaches to the end of the actuator arm and is adapted to fly over the data surface. The slider carries an optical transducer for near-field transducing optical information on the data surface. One aspect of the invention includes a mesa carried on an air bearing surface of the slider. A coil of the optical transducer is formed of an electrical conductor and extends around the mesa. In one aspect, the optical transducer includes an optical source having a focussing mechanism and the mesa comprises a portion of the focussing mechanism. Further, in one aspect the mesa includes a plateau adapted to couple light to the data surface through an evanescent field. In another aspect of the invention, the mesa has a tapered side wall and light passing through the mesa substantially forms a cone wherein the cone does not extend beyond the side wall.

DETAILED DESCRIPTION OF THE PREFERRED EMBODIMENTS

The present invention relates to optical data storage systems. In particular, the present invention relates to sliders for use with optical data storage systems which employ near-field optical recording techniques or those which use a slider for carrying a transducing head or otherwise optically couple to a data surface to read and/or write information thereon. Such optical data storage systems use a slider to carry the optical transducing elements adjacent the data surface of an optical storage medium such as an optical disc. U.S. Pat. No. 5,497,359 issued Mar. 5, 1996 entitled "OPTICAL DISC DATA STORAGE SYSTEM WITH RADIATIONTRANSPARENT AIR-BEARING SLIDER" illustrates one slider designed for optical recording.

When optically recording information using the near field (or evanescent field) the optical transducing element includes, for example, a Solid Immersion Lens carried on the slider which flies over the magnetic disc. Such a Solid Immersion Lens is shown in U.S. Pat. No. 5,125,750, entitled "OPTICAL RECORDING SYSTEM EMPLOYING A SOLID IMMERSION LENS." To write a bit of data on the M-O disc, a laser heats up a small spot on the disc through the Solid Immersion Lens to a temperature above the Curie temperature of the medium. A magnetic coil carried on the air bearing surface of the slider is energized and the laser is turned off. As the magnetic medium cools below the Curie point, the heated spot is left with the desired magnetic orientation.

The efficiency of this recording process relies on the ability of the laser and the coil to switch on and off quickly. The coil must provide a sufficiently large magnetic field to ensure that the media is magnetically oriented as desired. Factors which contribute to the magnetic field of the coil include:

1) The electrical current through the coiled. (A linear effect.)
2) The number of turns in the coil. (A linear effect.)
3) The separation distance of the inner most turns of the coil relative to the mesa. (A inverse square effect.)

The ability of the coil to switch on and off quickly is a function of the inductance of the coil which is predominantly determined by the number of turns of the coil.

Another factor in designing a coil is the heat which is generated by the coil during operation. The heat generation is a function of the square of the electrical current times the resistance of the coil ($I^2R$). The heat generated during the operation of the coil must be dissipated. Further, the thermal transients and the bulk heat can have serious consequences during operation. It would be desirable to minimize the amount of heat generated by the coil.

One aspect of the present invention includes the recognition of a new slider design and coil configuration to accommodate the coil and the lens element in an optical transducing assembly. More specifically, the present invention includes a new mesa carried on the air bearing surface positioned at the center of the coil.

Figure 1:
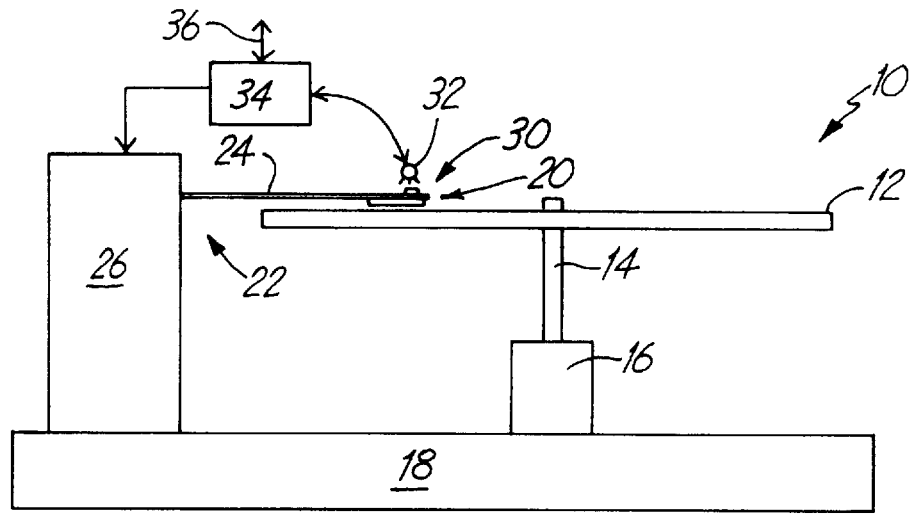
FIG. 1 is a simplified diagram showing an optical storage system in accordance with the present invention.

FIG. 1 is a simplified illustration of an optical recording system 10 employing a slider in accordance with the present invention. System 10 includes optical disc 12 having a data surface which carries optically encoded information. Disc 12 rotates about spindle 14 and is driven by a spindle motor 16 mounted on base 18. A slider 20 is positioned proximate disc 12 and is coupled to an actuator 22 which includes armature 24 and actuator motor 26 which couples to base 18. Slider 20 includes an optical transducer 30. An optical transducing element includes optical source/sensor apparatus 32. A controller 34 couples to apparatus 32, actuator 26 and data bus 36 and is used for controlling operation of system 10.

During operation, disc 12 rotates and slider 20 is positioned radially along the data surface of disc 12 using actuator 22. Controller 34 controls the position of slider 20, whereby information may be read from the data surface of disc 12 using optical source/sensor apparatus 32 and received or transmitted over data bus 36.

Figure 2:
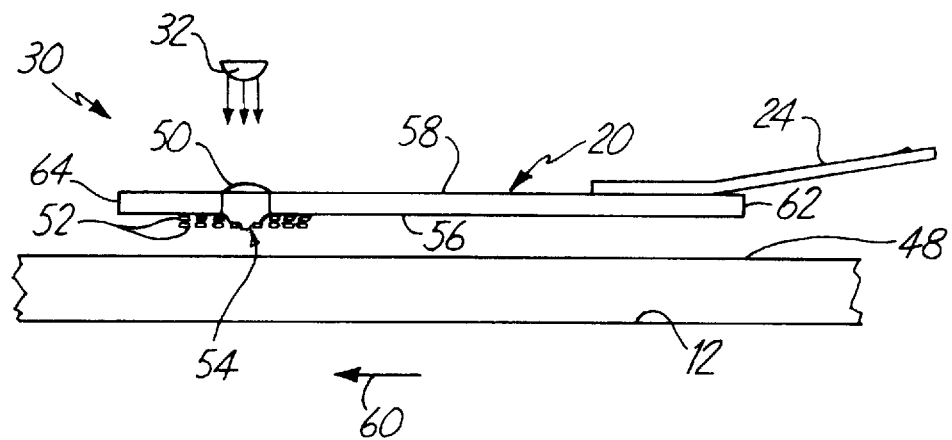
FIG. 2 is a side plan view showing a slider of FIG. 1 in accordance with the present invention.

FIG. 2 is a simplified side view of slider 20 in accordance with the invention and shows transducer element 30. Slider 20 is shown proximate the data surface 48 of optical disc 12. Transducer element 30, in the embodiment shown, includes a SIL-type (Solid Immersion Lens) lens (which is formed by lens cap 50 and the body of slider 20) and electrical conductors 52 formed in a coil shape. Conductors 52 are coiled about mesa 54 in accordance with the present invention. Slider 20 includes an air bearing surface 56 and a top surface (or opposing surface) 58. Mesa 54 is carried on air bearing surface 56. Disc 12 rotates in the direction indicated by arrow 60 whereby slider 20 has a leading edge 62 and a trailing edge 64.

Based on the need to provide a light path for the laser to pass through the mesa along with the goals of minimizing resistance and inductance while maximizing the magnetic field at the surface of the media, the mesa of the present invention is provided.

A stepped mesa design which approximates a 45° angle, in one embodiment, is provided. This is preferably accomplished through using a two step mask process. The first mesa (cavity) mask etches a small mesa width with the second mesa mask etching a larger base. This coupled with the natural rounding in the bottom corners of the mesa will provide a means to achieve the desired design. The one trade off for this design is an additional mask and etching step. However, this mask may also be useful to accommodate other aspects of manufacturing associated with photo-resist adhesion and etching issues. The 45° angle may also be approximated by altering the ion etching process to achieve the desired wall profile. In this example the angle of the part relative to the ion beam path would be altered to provide the mesa with an angle which approaches the desired angle.

Figure 3:
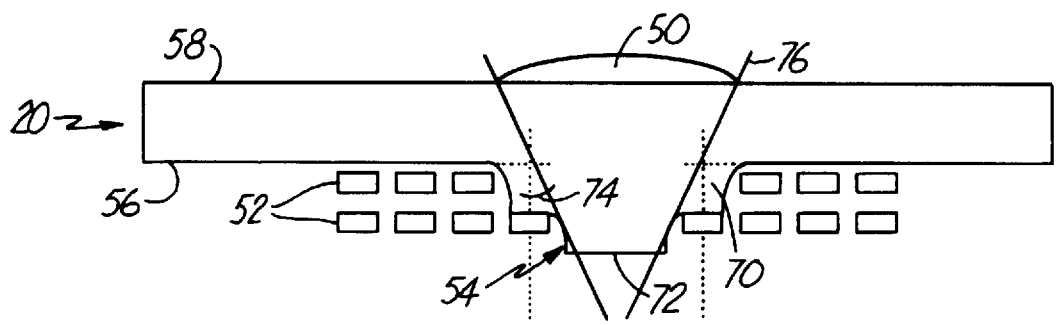
FIG. 3 is a front cross-sectional view of the slider of FIG. 2 showing a mesa in accordance with the present invention.

FIG. 3 is a front cross-sectional view of slider 20 showing mesa 54 in greater detail. Mesa 54 includes step 70 and plateau 72. In the embodiment shown, step 70 and plateau 72 form an angle 74 with surface 56 of about 45°. FIG. 3 also shows a cone 76 formed by optical rays entering slider 20 through lens cap 50. In one preferred embodiment, the angle 74 and the size of mesa 54 are selected such that cone 76 follows the side wall of mesa 54. Alternatively, the mesa wall can be designed to follow the cone of light, the coils are thus wrapped as closely as possible. Thus, the present invention reduces the area of the distal level of the mesa allowing the conductors 52 to be more tightly coiled.

Figure 4:
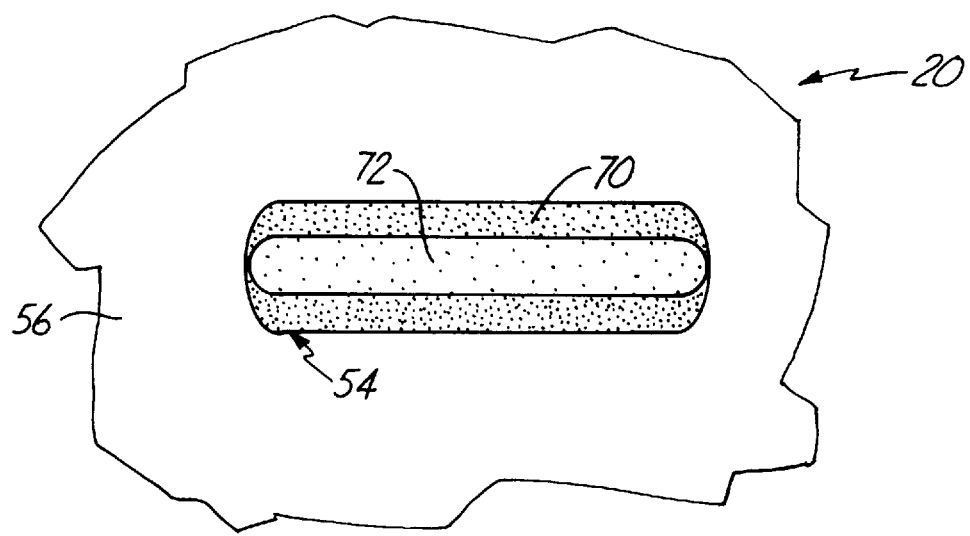
FIG. 4 is a bottom plan view of the slider of FIGS. 2 and 3 showing the mesa.

FIG. 4 is a bottom plan cut away view of a portion of slider 20. FIG. 4 shows mesa 54 on air bearing surface 56 including plateau 72 and step 70. For simplicity, electrical conductors 52 are not shown in FIG. 4.

The present invention provides a number of benefits over the prior art. This includes reducing the length of the electrical conductor of the coil to thereby reduce the resistance of the coil which results in less heating. Further, the coil structure is narrowed in the region closest to the mesa thereby increasing the magnetic field of the coil while reducing the number of turns and the current required to produce the magnetic field. (Note that the reduced number of turns also reduces the resistance of the coil.) Further, by reducing the number of turns required in the coil structure, the inductance of the coil is reduced such that the switching time may also be reduced. This permits faster switching thereby allowing increased data rates. Additionally, a full radius is provided at the ends of the mesa to thereby provide a smoother coil transition and reduced resistance in each of the turns in the coil. The step structure of the mesa also reduces the probability that the first coil regions will be electrically shorted. The offset coil structure also reduces the overall height of the coil. Preferably, the coil is located below the plateau 72 of the mesa 54.

The present invention can be employed with any type of optical system using a coil and is not limited to the particular embodiment of a SIL set forth herein. Further, multiple steps may be formed. The angle of the steps may be adjusted as appropriate for design constraints and system optimization. A smooth side wall or other side wall geometries may also be used. The mesa structure may be formed directly in the slider or may be fabricated separately. The particular fabrication techniques are not limited to those set forth herein.

Although the present invention has been described with reference to preferred embodiments, workers skilled in the art will recognize that changes may be made in form and detail without departing from the spirit and scope of the invention.

What is claimed is:

1. An optical disc data storage system, comprising:

an optical disc having a data surface;

an actuator arm having a distal end selectively radially positionable adjacent the data surface;

a transducing element including an optical element for optically coupling with an optical source and an electrical conductor formed in a coil;

a controller coupled to the actuator arm and the transducing element for positioning the actuator arm and for transducing information on the data surface through the transducing element, the controller supplying a current to the electrical conductor during a write operation; and a slider coupled to the distal end of the actuator arm and carrying the transducing element, the slider having a top surface and an air bearing surface adapted to move adjacent the data surface as the disc rotates, the slider including a mesa formed on the air bearing surface and extending from the air bearing surface toward the data surface and configured to accommodate the coil, the coil proximate the air bearing surface and wound around the mesa in a path generally parallel with the air bearing surface and generally coplanar with the mesa.

2. The optical disc data storage system of claim 1 wherein the optical element includes a focussing mechanism and the mesa comprises a portion of the focussing mechanism.

3. The optical disc data storage system of claim 2 wherein the mesa includes a plateau adapted to couple light to the data surface through an evanescent field.

4. The optical disc data storage system of claim 1 wherein the mesa has a tapered side wall.

5. The optical disc data storage system of claim 4 wherein light from the optical source passes through the mesa substantially forming a cone, and a cross sectional area of the tapered side wall is greater than a cross-sectional area of the cone whereby the cone does not extend beyond the tapered side wall, and the taper of the side wall is selected to substantially match the taper of the cone.

6. The optical disc data storage system of claim 4 wherein the tapered side wall is formed by at least one step in the mesa.

7. The optical disc data storage system of claim 6 wherein a portion of the electrical conductor is positioned on the step.

8. The optical disc data storage system of claim 7 wherein the electrical conductor includes a first coil plane and a second coil plane, the first coil plane adjacent the step and the second coil plane adjacent the slider and positioned between the first coil plane and the air bearing surface of the slider.

9. The optical disc data storage system of claim 4 wherein the tapered side wall forms an angle of about 45° with the air bearing surface of the slider.

10. The optical disc data storage system of claim 2 wherein the focussing mechanism includes a Solid Immersion Lens (SIL) and the mesa forms a portion of the SIL.

11. The optical disc data storage system of claim 1 wherein the mesa is formed in the slider through a masking and etching process.

12. The optical disc data storage system of claim 1 wherein the optical element includes a lens cap coupled to the top surface of the slider and substantially aligned with the mesa.

13. The optical disc data storage system of claim 1 wherein the mesa is elongated in a plane of the air bearing surface.

14. The optical disc data storage system of claim 1 wherein the optical source includes a laser.

15. The optical disc data storage system of claim 1 wherein the coil is formed in a manner to increase the electrical inductance and decrease the electrical resistance of the electrical conductor.

* * * * *

Adverse Decision In Interference

Patent No. 5,831,797, Mark J. Schaenzer, Lori G. Swanson, Gregory S. Mowry, Lance E. Stover, SLIDER WITH MESA FOR OPTICAL DISC DATA STORAGE SYSTEM, Interference No. 105,058, final judgment adverse to the patentees rendered October 29, 2003, as to claims 1-15.

*(Official Gazette October 5, 2004)*

Adverse Decision In Interference

Patent No. 5,831,797, Mark J. Schaenzer, Lori G. Swanson, Gregory S. Mowry, Lance E. Stover, SLIDER WITH MESA FOR OPTICAL DISC DATA STORAGE SYSTEM, Interference No. 105,058, final judgment adverse to the patentees rendered October 29, 2003, as to claims 1-15.

*(Official Gazette January 18, 2005)*